United States Patent [19]
Eberly et al.

[11] 3,752,300
[45] Aug. 14, 1973

[54] BALER FEEDING SYSTEM

[75] Inventors: Harry G. Eberly, Narvon; Raymond E. Fisher, New Holland, both of Pa.

[73] Assignee: Sperry Rand Corporation, New Holland, Pa.

[22] Filed: Dec. 23, 1970

[21] Appl. No.: 100,978

Related U.S. Application Data

[62] Division of Ser. No. 664,685, Aug. 31, 1967, Pat. No. 3,570,395.

[52] U.S. Cl. ............................................. 198/212
[51] Int. Cl. ............................................. B65g 29/00
[58] Field of Search .............................. 198/212, 25; 280/180

[56] References Cited
UNITED STATES PATENTS

| 415,796 | 11/1889 | Riesech | 198/212 |
| 1,958,846 | 5/1934 | Christensen | 198/25 |
| 2,224,975 | 12/1940 | McNamara | 198/25 X |
| 3,096,709 | 7/1963 | Eldred et al. | 198/25 X |

*Primary Examiner*—Evon C. Blunk
*Assistant Examiner*—Douglas D. Watts
*Attorney*—Joseph A. Brown et al.

[57] ABSTRACT

A feeding mechanism for a pickup baler in which a rotary feed unit delivers crop material to a set of packer fingers which convey the material into the bale chamber between plunger strokes. The rotary feed unit is mounted for operation about a generally vertical axis and comprises two sets of feed fingers which successively sweep crop material across the feeder platform and into the path of the packer fingers. Tee angular position of the feed fingers is controlled by a circular cam track.

1 Claim, 6 Drawing Figures

Patented Aug. 14, 1973 3,752,300

INVENTORS
HARRY C. EBERLY
& RAYMOND E. FISHER
BY George C. Bower
ATTORNEY

Patented Aug. 14, 1973

INVENTORS
HARRY C. EBERLY
& RAYMOND E. FISHER

BY George C. Bower

ATTORNEY

INVENTORS
HARRY C. EBERLY
& RAYMOND E. FISHER

BY George C. Bower

ATTORNEY

BALER FEEDING SYSTEM

RELATED APPLICATION

This is a division of our patent application Ser. No. 664,685 filed on Aug. 31, 1970 U.S. Pat. No. 3,570,395 and entitled "Baler Feeding System."

BACKGROUND OF THE INVENTION

A typical pickup baler comprises a wheel-supported frame which carries a fore-and-aft extending bale chamber and a plunger reciprocably mounted therein for compressing crop material into bales. A feeder housing extends from one side of the bale chamber, and crop material is delivered to a floor, or platform, in the housing by a rotatable pickup located forwardly of the feeder housing. A feeding mechanism operable in the housing is adapted to move crop material across the platform and deliver it into the bale chamber.

In some types of balers, the feeding mechanism comprises an auger, or other continuous feed means, for conveying the material across the feeder platform and into the bale chamber. Since an auger, or conveyor of this type, is fixed against shifting longitudinally in the direction of feeding, the delivery end of the conveyor must necessarily terminate outside the bale chamber, with the result that material is not conveyed as far into the bale chamber as is desirable. When the material is not effectively distributed in the bale chamber, uneven and poorly shaped bales are produced by the baler.

Finger feeding mechanisms have been developed in which the fingers themselves penetrate into the bale chamber through slots in the top wall of the chamber. An improved distribution of the crop material in the bale chamber is obtained by the use of the feed fingers. However, since these fingers cross the path of the reciprocating plunger, the fingers and the plunger must be timed so that the plunger does not strike the fingers. Two types of finger mounting means are used extensively. In one type of mounting means, the fingers are carried on a reciprocating carriage; in a second type, the fingers are mounted on rotating cranks which cause the fingers to move through an orbital path. A disadvantage of the carriage mounted fingers is the wear problems which occur because of the reciprocating movement and the rapid acceleration and deceleration of the carriage.

It is common to employ a set of orbiting feed fingers adjacent the bale chamber for delivering the material into the bale case. A second conveying means, e.g., another set of orbiting feed fingers, or an auger, is mounted over the outboard side of the feeder platform for moving the material across the platform and into the path of the fingers operating adjacent the bale chamber. These types of feeding mechanisms normally work well in medium capacity balers having plunger speeds of 80 strokes a minute, or less. However, they have not been generally satisfactory in high capacity balers operating at plunger speeds approaching 100 strokes per minute. One main problem has been in moving the material across the feeder platform at sufficient speed and in delivering it to the fingers adjacent the bale chamber in a desired form. If the material delivered to the fingers is matted and highly compressed, it is difficult for the fingers to penetrate the material and move it into the bale chamber.

SUMMARY OF THE INVENTION

The feeding mechanism of this invention comprises a pair of feed units. A first feed unit operates adjacent the bale chamber and comprises an orbiting set of packer fingers. The packer fingers operate over a small area of the platform in the feeder housing, and run at the same speed as the baler plunger.

A second feed unit is mounted forwardly of, and outboard of, the packer fingers. The second unit is a rotary unit and includes two diametrically opposed sets of feed fingers. A caming mechanism regulates the angular position of each set of fingers so that when the fingers pass over the platform they are in a generally vertical position and as the fingers move away from the platform and over the rotatable pickup they are moved to a generally horizontal position. The speed of the rotary feed unit is one-half the speed of the plunger.

The fingers of the rotary feed unit enter the crop material at the outboard side of the platform when the material is still oriented in substantially the same manner as it was in the windrow. The fingers sweep the material across the platform in this form and deliver it to the packer fingers. As the feed fingers pass adjacent to the packer fingers, they are cammed upwardly to lift them out of the crop material. The packer fingers immediately enter the material in the area occupied by the feeder fingers, and thus, they do not have to penetrate a compressed mass of crop material. The relatively slow speed at which the rotary feed unit operates, due to the two sets of feed fingers, permits an even continuous flow of the crop material toward the bale chamber. The windrow of material, lifted to the feeder platform by the pickup, is conveyed across the platform by the feed fingers, without a substantial change in the orientation of the crop material.

The principal object of this invention is to provide a feeding mechanism for a baler of the type described which can be efficiently operated with high speed plungers.

Another object of this invention is to provide a finger feeding mechanism in which the material is conveyed across the platform in an even continuous movement.

Another object of this invention is to provide a feeding mechanism which can be operated on crop material as it comes from the windrow, and without the precompressing thereof by the pickup.

Other objects of this invention will be apparent hereinafter from the specification and from the recital in the appended claims.

FIG. 4 is a developed view of the cam track employed in the rotary feed unit.

DESCRIPTION OF THE PREFERRED EMBODIMENT

Figure 1:
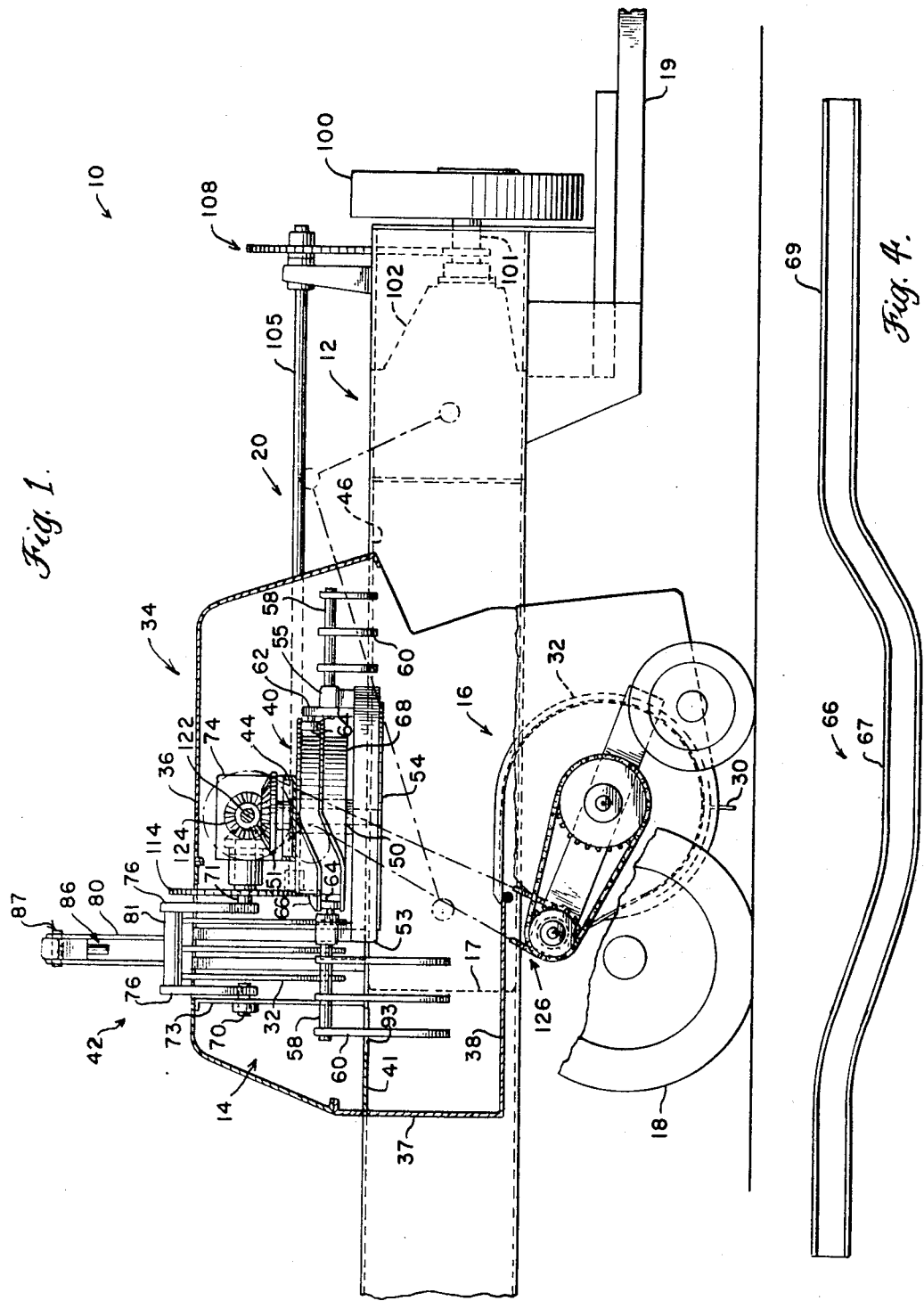
FIG. 1 is a side elevational view of a pickup baler, a portion of the feeder housing being shown in section to expose the feeding mechanism of this invention.
Figure 2:
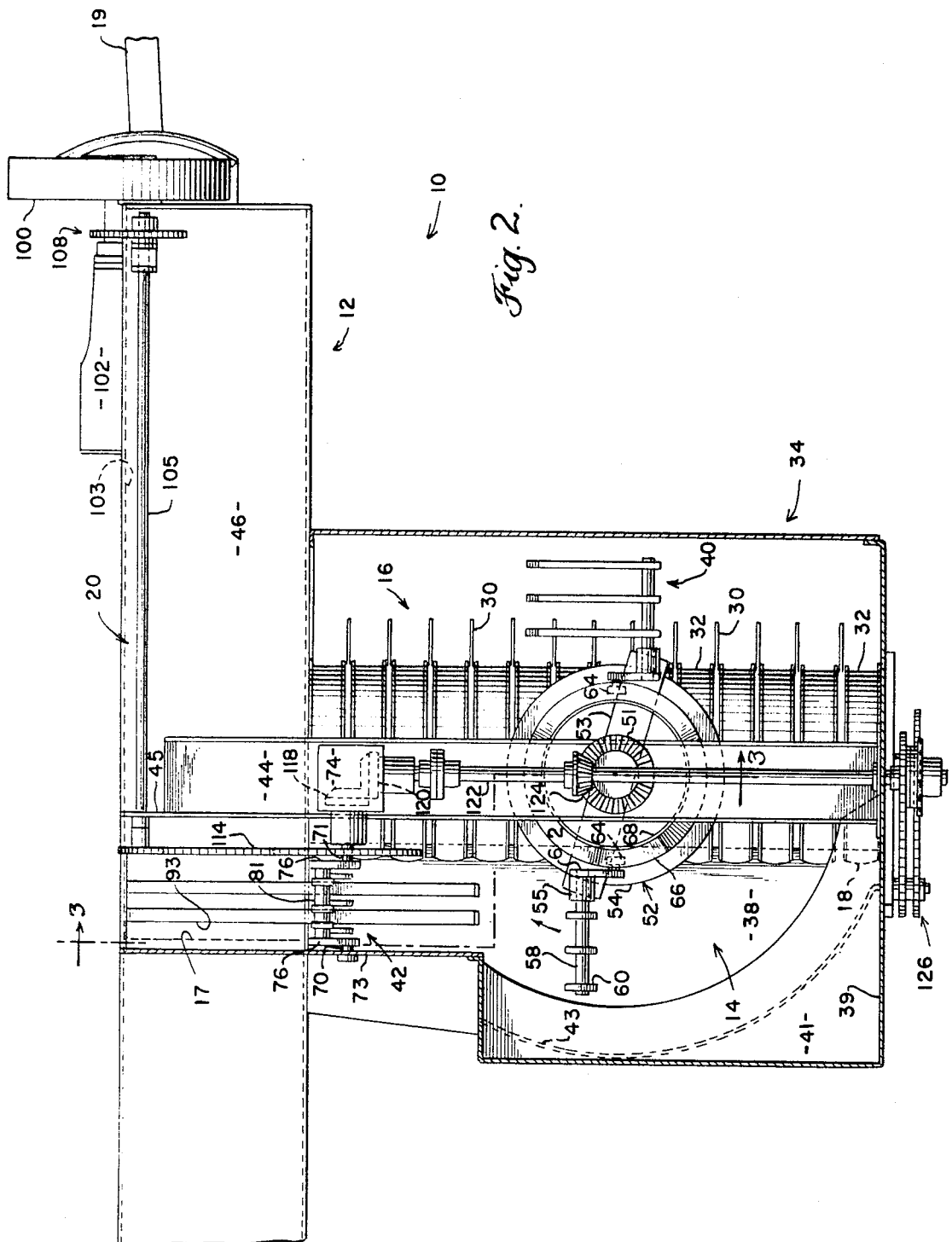
FIG. 2 is a plan view of FIG. 1, with the feeder housing shown in section.

Referring now to the drawings by numerals of reference and particularly to FIGS. 1 and 2, the baler selected to illustrate this invention is designated 10. Baler 10 comprises a bale chamber 12 which extends in a fore-and-aft direction, a feeding mechanism 14 which is adapted to convey crop material into the bale chamber, and a rotatable pickup 16 which lifts the crop material from the ground and delivers it to the feeding mechanism. A plunger 17 indicated diagrammatically in FIGS. 1–2 and 5–6, is mounted for reciprocable movement in bale chamber 12. Baler 10 is mounted on wheels 18 for movement through a field, and a tongue 19, shown fragmentarily in FIGS. 1 and 2, is adapted to be connected to a tractor, not shown. A drive system 20 furnishes power to the baler components and is in turn driven by the tractor power take-off, not shown.

Rotatable pickup 16, as shown in FIGS. 1 and 2, comprises a plurality of rows of circumferentially spaced pickup fingers 30 which engage the crop material on the ground and move it upwardly and rearwardly to the feeding mechanism. Fingers 30 are separated by laterally spaced stripper members 32.

A feeder housing 34 extends over rotatable pickup 16 and the feeding mechanism 14, and comprises a roof section 36, a vertically extending rear wall 37, a platform, a floor portion, 38, and an outboard side wall 39. A horizontal plate 41 and a circular wall portion 43 in the rear section of the feeder housing serve to confine the material it is being conveyed toward the bale case.

Feeding mechanism 14 comprises a rotary feed unit 40 which moves the crop material from the outboard side of the baler inwardly toward the bale chamber. Feed unit 40 delivers the material to an orbiting feed unit 42 which conveys the material into the bale chamber.

Rotary feed unit 40 is carried on a transversely extending support member 44 which is fixed at one end to a vertical wall 45 on top wall 46 of the bale chamber and at its opposite end to side wall 39 of the feeder housing. A vertically extending shaft 50 is journalled in support member 44 and carries a bevel gear 51 at its upper end and a feed finger carrier 52 on its lower end. Carrier 52 consists of a heavy frame member 53 and a circular plate 54 fixed to member 53 and adapted to prevent crop material from getting into the feed unit drive mechanism. At each end of frame member 53, a support element 55 is mounted which carries a rockshaft 58. A plurality of feed fingers 60 are fixed to each rockshaft 58, and the angular position of fingers 60 is regulated through a crank arm 62 fixed at one end to rockshaft 58. A roller 64 is mounted to the opposite end of crank arm 62, and the roller is adapted to run in cam track 66 which is carried on a cylindrical member 68 fixed to support member 44.

Figure 6:
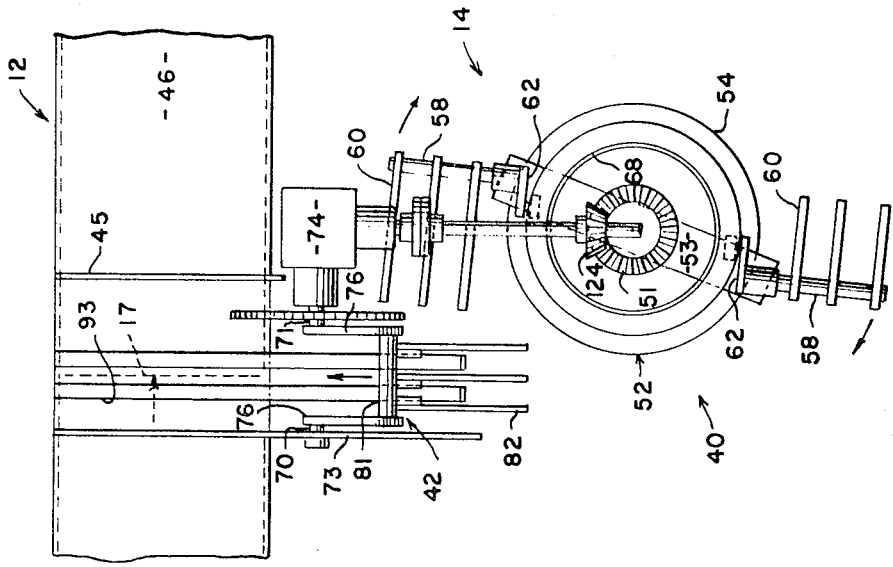
FIG. 6 is a view similar to FIG. 5, but showing the relative positions of the packer fingers and feed fingers in a different timing arrangement in which the feed fingers are timed to unload their charge of material while the packer fingers are relatively high above the platform.
Figure 5:
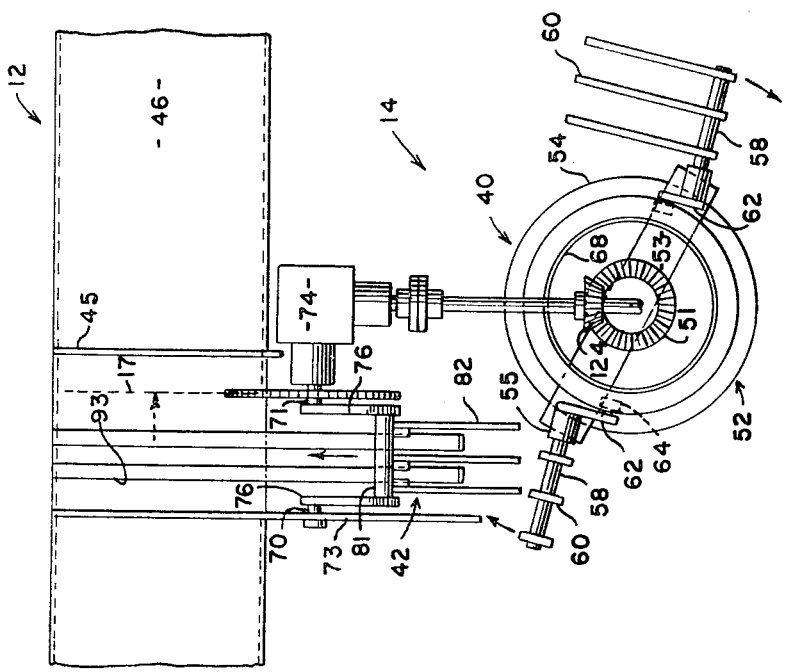
FIG. 5 is a diagrammatic plan view of the rotary feed unit, illustrating the relative positions of the packer fingers and the feed fingers when the feed fingers are timed to deliver the crop material just in front of the packer fingers.

The angular position of feed fingers 60 is positively controlled by cam track 66. A developed view of the cam track is shown in FIG. 4. Feed fingers 60 assume a substantially vertical position when the rollers are in the lower portion 67 of the cam track (see FIGS. 3 and 4). As the rollers move into the upper portion 69 of the cam track, the feed fingers are pivoted in a counterclockwise direction, as viewed in FIG. 3. With reference to FIGS. 2, 5–6, it will be noted that fingers 60 are mounted at an angle, in the radial direction, to member 53. With the feed fingers so mounted, the feed fingers extend generally in the same direction as the packer fingers when they release the material to the packer fingers (see FIG. 5). Further, this angular mounting permits the feed fingers to be housed in a smaller area than would be possible if they extended radially from member 53.

Figure 3:
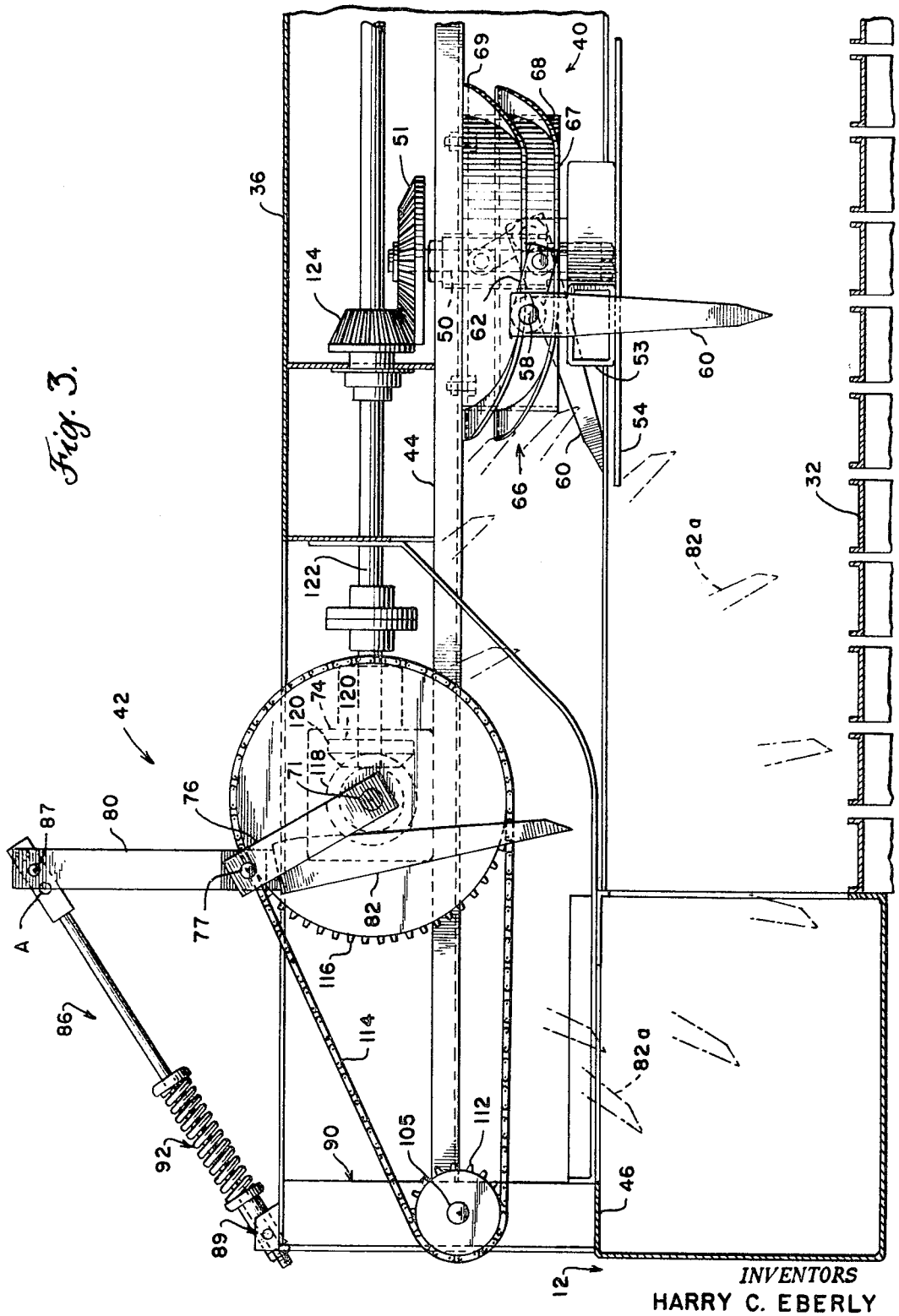
FIG. 3 is a somewhat enlarged section, taken approximately as indicated by the irregular line 3—3 in FIG. 2, and showing the path of travel of the packer fingers.

Feed unit 42, as best shown in FIGS. 2 and 3, comprises a pair of crank shafts 70 and 71 journalled respectively in a vertical wall 73 and gearbox 74. A crank 76 is mounted on each of the shafts 70 and 71 and a crank pin 77 joins the outer radial ends of the crank 76. Upwardly extending arms 80 are fixed to a hub 81 pivotally mounted on crank pin 77. Packer fingers 82 are fixed to hub 81 and extend generally opposite arms 80. A control link 86 is pinned at 87 to arms 80 and 89 to a vertical support 90 on bale chamber 12. A spring element 92 permits limited extension of the control link 86. The path of travel of the packer fingers is indicated by a series of packer finger end portions 82a, shown in dot and dash lines in FIG. 3. The packer fingers 82, in feeding the material into the bale chamber, pass through slots 93 in top wall 46 of the bale chamber.

Feeding mechanism 14 is driven by a drive system 20 which comprises a baler flywheel 100 operatively connected to the tractor power take-off, not shown. A connecting shaft 101 extends rearwardly of flywheel 100 to a gearbox 102 mounted in side wall 103 of the bale case. A longitudinally extending main drive shaft 105 is carried on top wall 46 of the bale chamber and is connected to shaft 101 through a chain and sprocket drive 108.

Shaft 105 is journalled at its rear end in a vertical wall 45 and carries a sprocket 112 rearwardly of the wall 45. A chain 114 connects sprocket 112 to a sprocket 116 carried on shaft 71. Shaft 71 furnishes power to gearbox 74 through a bevel gear 118. Bevel gear 118 meshes with a second bevel gear 120 carried on a cross shaft 122. Cross shaft 122 drives rotary feed unit 140 through a bevel gear 124 which meshes with gear 51. At its outboard end, shaft 122 furnishes power to pickup 16 through a chain drive 126.

The timing of the feed fingers relative to the packer fingers can be controlled by disconnecting gear 124 and rotating the feed fingers to the desired position. The preferred arrangement is shown in FIG. 5, and in this arrangement, the feed fingers 60 deliver material just in front of the packer fingers 82, and the packer fingers move into the crop material in substantially the same area occupied by the feed fingers. A second timing arrangement is shown in FIG. 6, and in this arrangement, the charge of crop material is released on the platform by the feed fingers while the packer fingers are in an elevated position. The packer fingers are then moved rapidly in behind the delivered charge before it expands out of the delivered position.

In the operation of the described machine, crop material is delivered onto platform 38 by the rotatable pickup 16. A set of fingers 60 engages the material at the outboard side of the baler and moves the material across the platform 38 toward the bale chamber and into the path of packer fingers 82. The packer fingers then deliver material into the bale chamber. In the preferred embodiment, shown in FIG. 5, the feed fingers deliver the crop material just in front of the descending packer fingers. Just as the packer fingers move down into contact with the charge of crop material, the feed fingers are pivoted away from the packer fingers; as the feed fingers rotate toward the pickup, they are pivoted upwardly to a generally horizontal position. The fingers remain in a generally horizontal position as they move across the pickup and are again pivoted downwardly just before reaching platform 38 to pick up a new charge of material. Because of the two sets of feed fingers, the feed fingers are rotated at one-half the speed of the packer fingers and the plunger.

When rotary feed unit 40 first contacts the material at the outboard side of the feeder platform, the feed unit is travelling in generally the same direction as the material. As the feed unit 40 continues on around, it serves to turn the material toward the bale case. The relatively slow moving feed unit 40 thus exerts an even, continuous action on the material. The material is swept toward the bale case, without churning the material, and without changing the orientation of the material as it occurred in the windrow. There is no necessity for the pickup to serve as a precompressing means in this type of feeding mechanism.

It has been found that material, as it moves across the platform, tends to fold around the feed fingers 60 to form a slightly U-shaped charge. The packer fingers deliver the charge into the bale case in this form. Each of the U-shaped charges becomes a slice in the finished bale. The bales thus formed are easy to use when reopened and are very desirable due to their uniformity.

While this invention has been described in connection with a particular embodiment thereof, it will be understood that it is capable of further modification and this application is intended to cover any variations, uses or adaptations of the invention, following, in general, the principles of the invention, and including such departures from the present disclosure as come within known or customary practice in the art to which the invention pertains, and as fall within the scope of the invention as the limits of the appended claims.

What we claim is:

1. A rotary feed unit adapted to move crop material along a feeder platform in a baler, said feed unit comprising a generally vertical extending shaft journalled on said hay baler, a carrier frame element fixed to said shaft intermediate its end, a pair of rock shafts journalled on said frame element, said rock shafts extending generally horizontally and being diametrically opposed to each other, said rock shafts being set at an angle to the radial extension of said frame element, a plurality of feed fingers fixed to each of said rock shafts and axially spaced thereon, and cam follower means fixed to each of said rock shafts and carried in a cam track extending around said vertically extending shaft.

* * * * *